(No Model.)

G. POOLE.
MACHINE FOR DRIVING ENDLESS ROPES FOR THE PROPULSION OF STREET CARS.

No. 296,057. Patented Apr. 1, 1884.

3 Sheets—Sheet 1.

WITNESSES
Wm A. Skinkle
Cel. C. Newman

INVENTOR
George Poole,
By his Attorneys
Baldwin, Hopkins & Peyton (No Model.) 3 Sheets—Sheet 2.

G. POOLE.
MACHINE FOR DRIVING ENDLESS ROPES FOR THE PROPULSION OF STREET CARS.

No. 296,057. Patented Apr. 1, 1884.

WITNESSES.
Wm A. Skinkle
Cel. C. Newman

INVENTOR
George Poole,
By his Attorneys
Baldwin, Hopkins & Peyton.

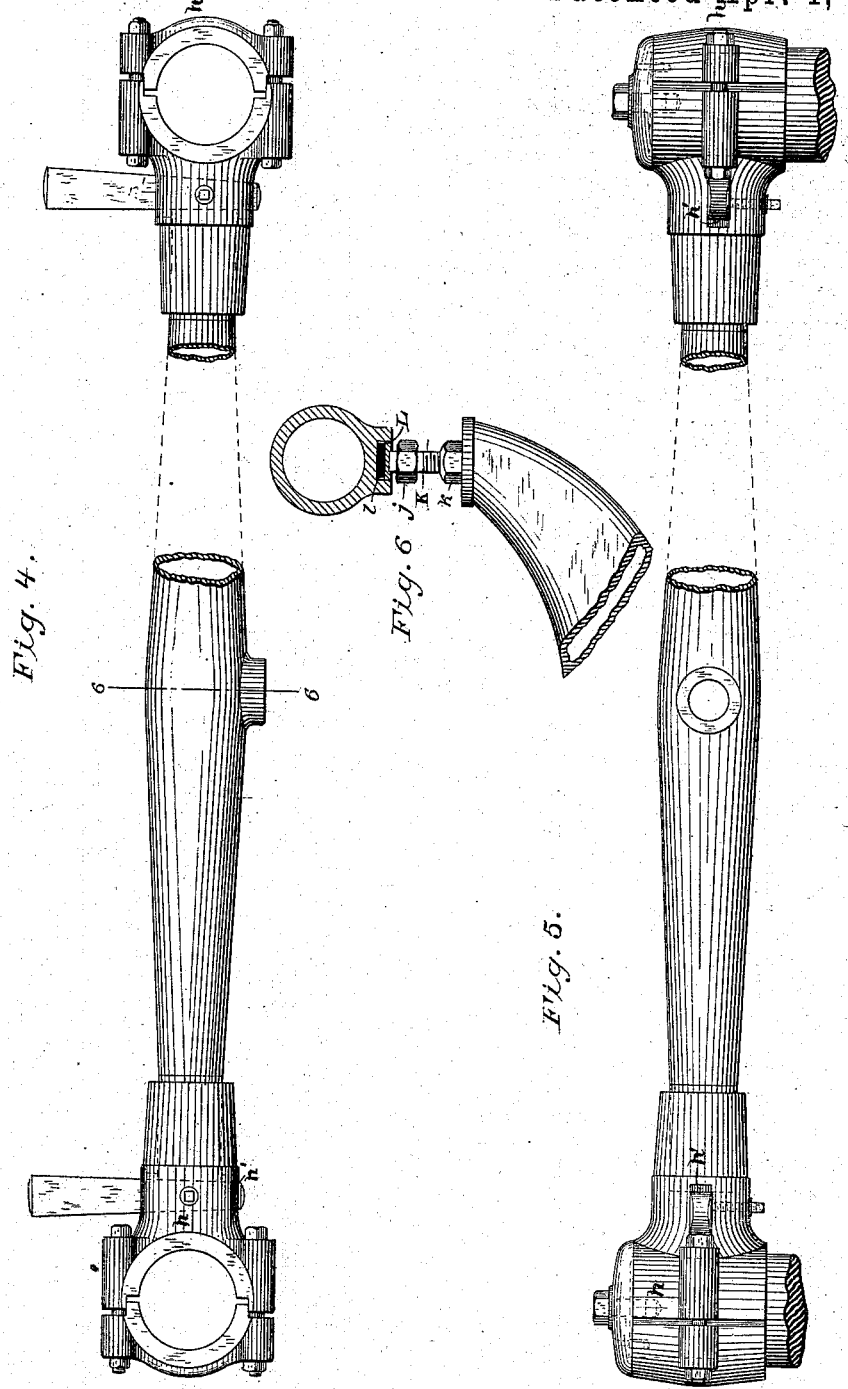

UNITED STATES PATENT OFFICE.

GEORGE POOLE, OF BALTIMORE, MARYLAND.

MACHINE FOR DRIVING ENDLESS ROPES FOR THE PROPULSION OF STREET-CARS.

SPECIFICATION forming part of Letters Patent No. 296,057, dated April 1, 1884.

Application filed January 25, 1884. (No model.)

*To all whom it may concern:*

Be it known that I, GEORGE POOLE, of the city of Baltimore, in the State of Maryland, have invented certain new and useful Improvements in Machinery for Driving Endless Ropes for the Propulsion of Street-Cars, &c., of which the following is a specification.

My invention relates more especially to improvements in endless-rope-driving machinery of the class in which two ropes are passed several times about their respective sets of driving grooved drums.

My objects, mainly, are to provide for inspecting one of the ropes while the other is in operation, and to provide for securely bracing the drums of the respective sets, so as to sustain them against the excessive strains to which the machine is subjected.

Figure 1:
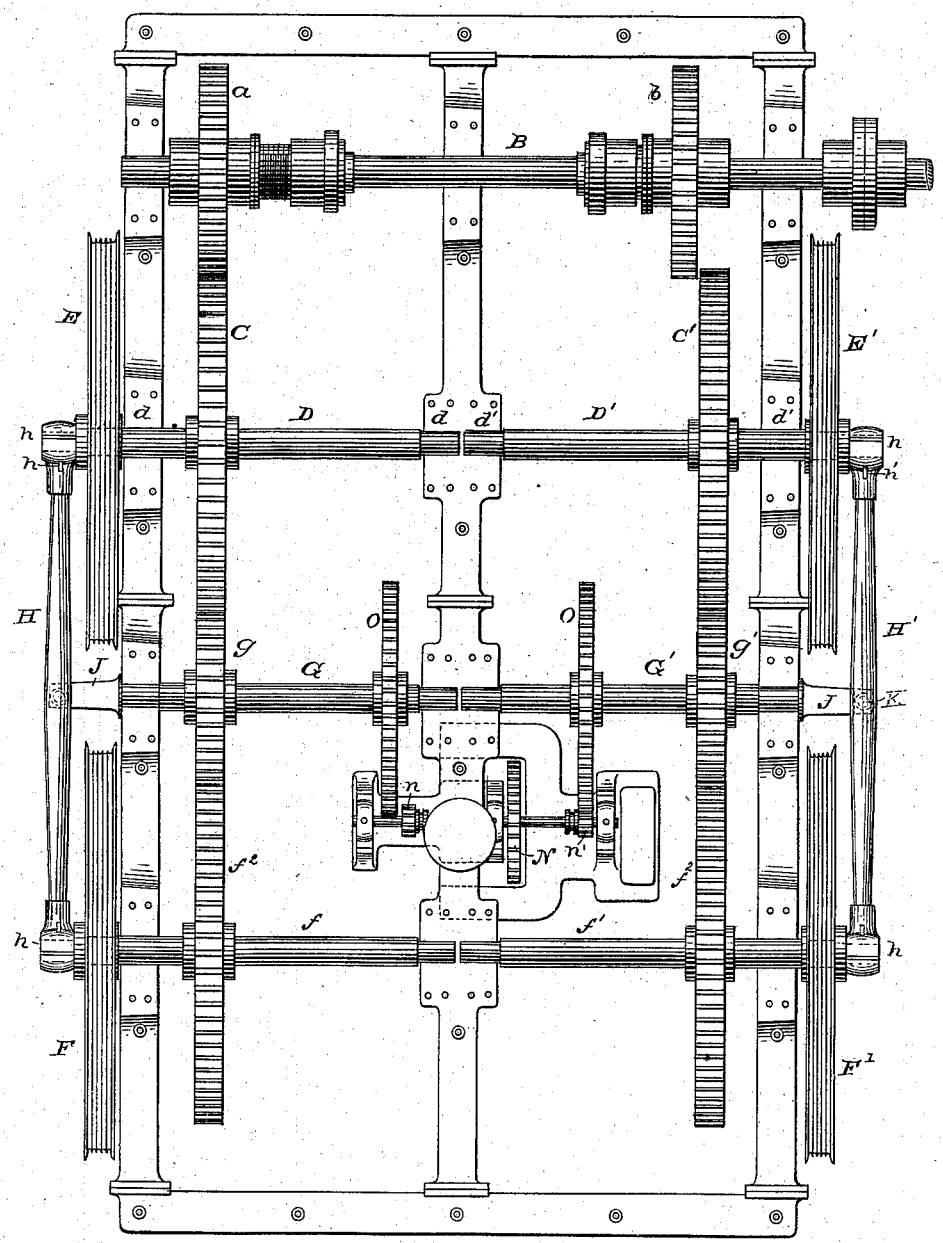
Figure 2:
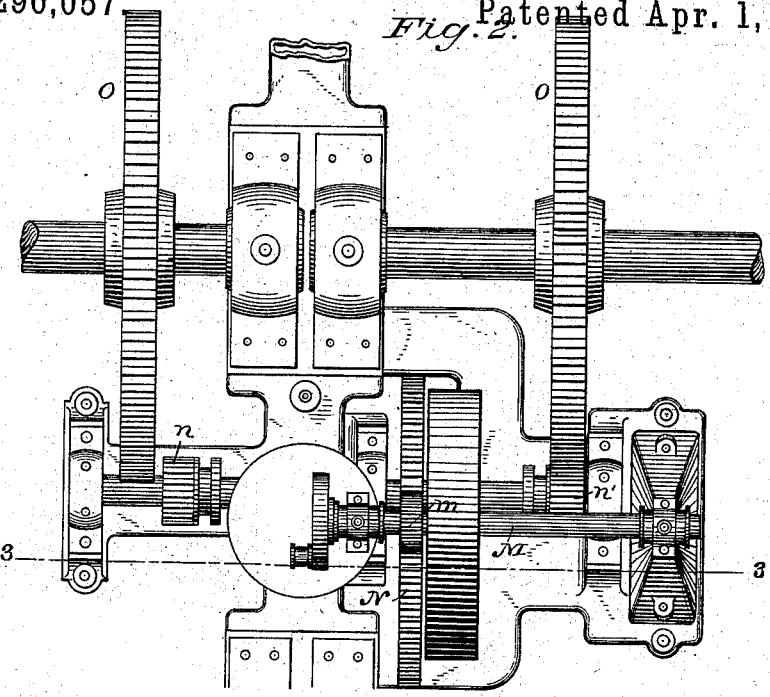
Figure 3:
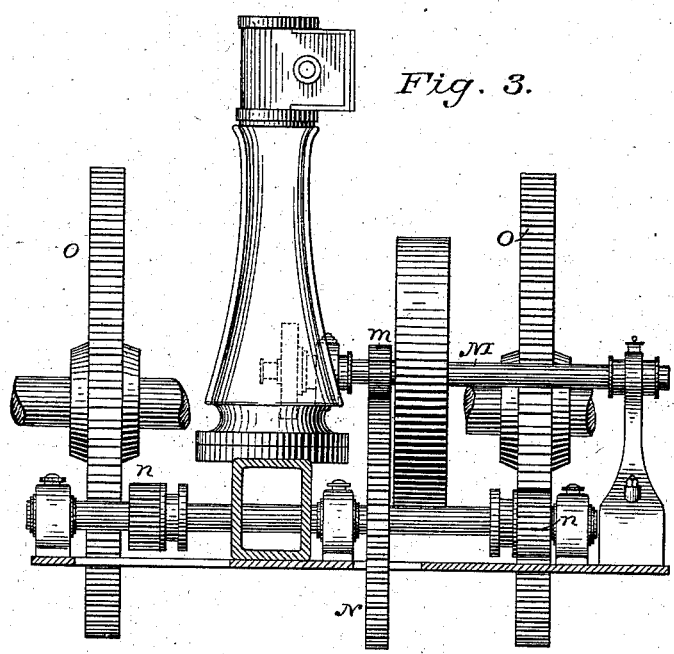

In the accompanying drawings, Figure 1 is a plan view of mechanism organized in accordance with my invention. Fig. 2 is a plan view, showing details of the auxiliary motor mechanism. Fig. 3 is a view partly in rear elevation and partly in section on the line 3 3 of Fig. 2. Figs. 4, 5, and 6 show the details of one of the bracing-struts.

A suitable supporting-frame, preferably of hollow castings, is provided with proper bearings for the main driving-shaft B, upon which are adjustably secured two gears, $a b$, by means of clutches of well-known construction, serving to slide the pinions along the shaft, so that they may be engaged with or disengaged from their respective gears C C'. These gears are mounted upon shafts D D', which turn in suitable bearings, $d\ d\ d'\ d'$, the outer ends of the two shafts overhanging or projecting from the frame-work, and supporting outside of it the grooved driving-drums E E'. Two other similar driving-drums, F F', are mounted upon shafts $f f'$, turning in bearings corresponding with those provided for the shafts D D', the two drums F F' overhanging the frame, as before described with relation to the first two drums. Two idle or intermediate shafts, G G', have secured upon them pinions $g g'$, which mesh with the gears on the shafts D D', as well as with gears $f^2 f^2$ on the shafts $f f'$.

The shafts which support the two sets of drums—one set at each side of the frame—are braced so as to relieve their bearings and the ends of the shafts of unnecessary strains in the following way: The projecting ends of the drum-shafts are connected by means of struts H H' at the opposite sides of the frame. These struts are precisely alike, and detailed description of one of them only need be given. The strut is preferably tubular, and at each end is turned truly and faced off, and has fitted to its ends, so as to turn about them, socket-boxes or bearing-heads $h\ h$. The sleeve or socket of each of these boxes fits snugly about the strut end, and a transverse slot, $h'$, is made through each of the boxes, and suitable antifriction linings are provided for the bearings to fit about the ends of the drum-shafts.

In adjusting the struts in position it will be seen that by the turning of the boxes about the ends of the struts accurate adjustment of parts is provided for, and, when properly adjusted, keys or wedges are driven through the slots $h'$, and, acting against the ends of the struts, hold the parts in position. Set-screws to hold the keys in their adjusted position are provided. It will thus be seen that the struts may readily be adjusted in length to suit the distance between the shafts with which they connect, and that wear of the parts may be compensated for.

To relieve the bearings and the overhanging ends of the shafts from the weight of the struts, they are adjustably supported midway their lengths, so as to be about balanced, in the following way: Frame-brackets J J serve to support screw-bolts K K, each of which is provided with a head, $j$, and a nut, $k$, the latter, as shown, resting upon its supporting-bracket, while the upper end of the bolt bears against a washer in a socket, L, in the under side of the strut, the washer being yieldingly seated against a rubber cushion, $l$; or it may be a spiral spring, if preferred.

From the above description it will be seen that by turning the bolt while holding the nut, or by turning the nut while holding the bolt against being turned, the parts may be so adjusted as to sustain the weight or greater portion of the weight of the strut.

In order that either of the endless ropes may be actuated independently of the main driving-shaft and the main motor by which it is operated, and in this way allow for inspection of the one rope while the other is in operation—for propelling street-cars, for instance—a suitable supplementary motor is provided for driving the drums by means of the respective idle-shafts G G', the drums which are to be actuated from the auxiliary motor having for the time no gearing connection with the main driving-shaft.

The supplementary motor and its connections with the idle-shafts, as in this instance shown, are as follows: A suitable motor (an upright engine in this instance being partly shown) connects with a crank on the supplementary motor-shaft M, which has a pinion, m, fast upon it engaging a gear upon an idle or intermediate shaft, N, which is provided with two shifting pinions, n n', by means of which connection may be made from the auxiliary motor with either of two gears, O O', on the before-described main idle-shafts G G', so that the pinion g or the pinion g' may be made to actuate their respectively-connected driving-drums, as will readily be understood from inspection of the drawings.

By my improvements it will be seen that by sliding one of the driving-pinions, a or b, out of engagement with its gear on the shaft D or D', the endless rope which is not in use may be driven slowly from the auxiliary motor without interfering with the operation of the working-rope, thus affording the fullest opportunity for inspection of the rope temporarily driven by the supplementary motor, and for stopping it for repairs.

It is obvious that my improvements may be applied either for driving duplicate ropes, (that is, ropes of corresponding length and running parallel with each other for the same route,) or for actuating two ropes for different routes, or for actuating two ropes constituting two sections of the same route terminating in proximity to each other, so that the rope extending in one direction may be actuated by the driving-drums at one side of the frame, and the rope extending in the opposite direction be driven by the drums at the other side.

By all of the above arrangements it will be seen that the auxiliary motor serves to independently drive the two sets of drums, and may be employed for actuating either set of driving-drums, when such set is disconnected from the main power, so as not to be operated by the main driving mechanism. It will also be seen that by mounting the drums upon the overhanging ends of their shafts, outside of the frame, and detachably connecting the shafts and the struts, provision is made for readily removing and replacing the ropes to facilitate inspection and repairs.

I claim as of my own invention—

1. The combination, substantially as hereinbefore set forth, of a main driving-shaft, two sets of driving-drums, shafts upon which the respective drums are independently mounted, gears upon said shafts, idle-shafts having pinions, each engaging two gears upon the drum-shafts, and adjustable pinions on the driving-shaft for engaging the gears upon the adjacent drum-shafts, for the purpose described.

2. The combination, substantially as hereinbefore set forth, of two sets of driving-drums, each set for actuating an endless rope independently of the other, a main driving-shaft, gearing by which the respective sets of driving-drums may be independently connected with and disconnected from said shaft, a supplementary motor, and connecting mechanism by means of which to independently actuate the respective sets of driving-drums from said motor, for the purpose described.

3. The combination of two sets of drums for independently actuating endless ropes, the main driving mechanism by which the two sets of drums may be independently connected with and disconnected from their main motor, the supplementary motor-shaft, and mechanism for independently connecting it with the respective sets of driving-drums, substantially as and for the purpose hereinbefore set forth.

4. The combination of the main driving-shaft, adjustable pinions, the two drum-shafts adjacent thereto, and provided with gears for engaging said pinions, the driving-drums on these two drum-shafts, the main idle-shafts, their pinions engaging the gears of said drum-shafts, the additional drum-shafts provided with gears also engaging the pinions on the idle-shafts, the supplementary motor-shaft, the idle-shaft geared therewith, the shifting pinions on this idle-shaft, and the gears on the main idle-shafts for engaging said pinions to independently actuate the respective sets of driving-drums from the supplementary motor, substantially as and for the purpose hereinbefore set forth.

5. The combination of the frame, the drum-shafts, the driving-drums mounted upon the overhanging ends of their shafts, and the struts provided with adjustable boxes for the overhanging ends of the drum-shafts, substantially as and for the purpose hereinbefore set forth.

6. The combination of the frame, a set of driving-drums, their shafts overhanging the frame at their outer ends to support the drums outside of the frame, the strut for making bracing connection between said shafts, the adjustable boxes at the ends of the strut, and means for adjustably supporting the strut about midway its length, substantially as and for the purpose hereinbefore set forth.

In testimony whereof I have hereunto subscribed my name this 25th day of January, A. D. 1884.

GEORGE POOLE.

Witnesses:
W. C. DUVALL,
J. I. PEYTON.